(12) United States Patent
Mikan et al.

(10) Patent No.: US 9,232,349 B2
(45) Date of Patent: *Jan. 5, 2016

(54) DYNAMIC GEOTAGGING OF PHOTOGRAPHS

(71) Applicant: AT&T Mobility II LLC, Atlanta, GA (US)

(72) Inventors: Jeffrey Mikan, Atlanta, GA (US); Justin McNamara, Dunwoody, GA (US); Fulvio Cenciarelli, Suwanee, GA (US)

(73) Assignee: AT&T Mobility II LLC, Atlanta, GA (US)

(*) Notice: Subject to any disclaimer, the term of this patent is extended or adjusted under 35 U.S.C. 154(b) by 123 days.

This patent is subject to a terminal disclaimer.

(21) Appl. No.: 14/041,326

(22) Filed: Sep. 30, 2013

(65) Prior Publication Data

US 2014/0024398 A1    Jan. 23, 2014

Related U.S. Application Data

(63) Continuation of application No. 11/668,538, filed on Jan. 30, 2007, now Pat. No. 8,548,424.

(51) Int. Cl.
*H04W 4/02* (2009.01)
*H04W 4/14* (2009.01)
*H04W 4/18* (2009.01)

(52) U.S. Cl.
CPC *H04W 4/02* (2013.01); *H04W 4/14* (2013.01); *H04W 4/185* (2013.01)

(58) Field of Classification Search
CPC .... H04M 3/42348; H04M 11/04; H04W 4/02
USPC .................... 455/404.2, 456.1–457
See application file for complete search history.

(56) References Cited

U.S. PATENT DOCUMENTS

| | | | |
|---|---|---|---|
| 8,548,424 B1* | 10/2013 | Mikan et al. ............... | 455/404.2 |
| 2001/0017668 A1 | 8/2001 | Wilcock et al. | |
| 2004/0002305 A1 | 1/2004 | Byman-Kivivuori et al. | |
| 2004/0224700 A1* | 11/2004 | Sawano ............ | G06F 17/30265 455/456.1 |
| 2005/0038876 A1 | 2/2005 | Chaudhuri | |
| 2005/0070278 A1 | 3/2005 | Jiang | |
| 2006/0248154 A1 | 11/2006 | Chu et al. | |
| 2007/0143779 A1* | 6/2007 | Kaarela ............. | H04N 7/17318 725/25 |

OTHER PUBLICATIONS

U.S. Office Action dated Aug. 20, 2009 in U.S. Appl. No. 11/668,538.
U.S. Office Action dated Mar. 9, 2010 in U.S. Appl. No. 11/668,538.
U.S. Office Action dated Jun. 23, 2010 in U.S. Appl. No. 11/668,538.
U.S. Office Action dated Nov. 29, 2010 in U.S. Appl. No. 11/668,538.
U.S. Notice of Allowance dated May 23, 2013 in U.S. Appl. No. 11/668,538.

* cited by examiner

*Primary Examiner* — Sharad Rampuria
*Assistant Examiner* — Farideh Madani
(74) *Attorney, Agent, or Firm* — Hartman & Citrin LLC

(57) ABSTRACT

A wireless mobile telecommunications network tags an image or other multimedia message that it receives from wireless user equipment (UE) with geographical information indicating the location of the UE. The network can determine the UE location using a conventional method such as those used in Location-Based Services.

20 Claims, 3 Drawing Sheets

DYNAMIC GEOTAGGING OF PHOTOGRAPHS

CROSS-REFERENCE TO RELATED APPLICATIONS

This application is a continuation of U.S. patent application Ser. No. 11/668,538, filed on Jan. 30, 2007, entitled "Dynamic Geotagging of Photographs", now U.S. Pat. No. 8,548,424, which is hereby incorporated by reference in its entirety.

BACKGROUND OF THE INVENTION

1. Field of the Invention

The present invention relates generally to wireless telecommunications networks and, more specifically, to geotagging digital photographs transmitted via a wireless mobile telecommunications network.

2. Description of the Related Art

Geotagging, also referred to as geocoding, is the process of adding geographical identification metadata to digital data files or data sources. The data file can represent any medium, with an image (e.g., photograph) being the most common. This data generally includes a geographic location in the form of latitude and longitude coordinates, but can also include a place name, altitude and other characteristics of a specific location. In theory, every part of a digital photograph can be tied to a geographic location, but in most instances only the position of the camera is associated with the entire digital image.

The most common method for geotagging a digital photo involves using a Global Positioning System (GPS) receiver. When a photo is taken, the location of the camera is recorded as digital data along with the digital data representing the image itself. Although there is currently no universal geotagging standard, some well-known digital image file format standards do specify formats for storing geographical coordinates along with the digital data representing the image. For example, the Joint Photographic Experts Group (JPEG) and Tagged Image File Format (TIFF) standards specify that geographical coordinates can be included in an Exchangeable Image File Format (EXIF) header. The EXIF header is commonly used in digital cameras to record the date and time a photo was taken. Although commercially available digital cameras generally do not contain a built-in GPS receiver, the photographer can use an external GPS device to identify and keep track of the location and time at which each photograph was taken, and later use commercially available software to incorporate the locations into the JPEG or TIFF files. A few specialized digital cameras have been developed that can be electronically connected to an external GPS receiver to facilitate geotagging photos.

Photographers often desire to upload their digital photos to a remote server computer. A photographer can upload photos by coupling the digital camera to a (client) computer with a cable or other local communication link and then uploading the photos from the client to the server via a network such as the Internet. It is also common for users of wireless mobile telecommunications network user equipment (UE) that include built-in digital cameras (sometimes referred to as "camera phones") to upload photos taken with the UE via the wireless telecommunications network. The wireless telecommunications network service provider typically provides a server on which the user can at least temporarily store the uploaded photos and with which the user can transfer them via the Internet to other computers, such as a server operated by a third-party photo hosting service or the user's home computer. It is also known to couple a digital camera to a UE via a cable, wireless local area network (WLAN) link such as WIFI, or wireless personal area network (WPAN) link such as BLUETOOTH, and upload the images from the camera to the wireless telecommunications network via the UE.

It is known to geotag uploaded photos, including photos taken with camera phones or similar UE. YAHOO!, Inc., which provides the FLICKR Internet photo hosting service, has developed a geotagging client application (software) known as ZONETAG that runs on camera phones and operates in conjunction with YAHOO!'s FLICKR photo uploader utility and service. A user can access FLICKR to view and manipulate uploaded photos via the Internet. When a user indicates through the ZONETAG application that a photo is to be uploaded, ZONETAG determines the identity of the cell (i.e., base station) through which the camera phone or other UE is then communicating with the network and tags the photo with an identifier that identifies the network and cell ("Cell 10") before uploading it to FLICKR. Once the photo has been uploaded, FLICKR attempts to translate the identifier into a geographic location. FLICKR has several ways in which it can gather information to assist it with the translation. When the user chooses to upload the photo, the user can enter a city name or ZIP code, which ZONETAG causes the camera phone to transmit along with the photo. Alternatively, the user can access FLICKR via the Internet and enter a ZIP code associated with the location where the user knows the photo was taken. The FLICKR server maintains a database that relates cell identifiers to city names, ZIP codes or other such identifying information. If a FLICKR user enters the city, ZIP code, etc., at which a photo was taken, FLICKR applies that information to not only that photo but also to other photos that the user may have taken within that same cell (i.e., that bear the same identifier) as well as the photos of other FLICKR users that were taken within that cell.

Wireless telecommunications network technologies such as General Packet Radio Service (GPRS) and Multimedia Messaging Service (MMS) have made it easier than ever for users to upload photographs from their UE. In a network employing such technologies, a received MMS message that includes a photo is routed to a Multimedia Messaging Service Center (MMSC), which performs many of the functions necessary to forward and otherwise handle the image.

The geographic location of a UE can be determined to an accuracy level greater than that defined merely by the cell in which the UE is located. The earliest use of sub-cell-level UE location related to emergency calling (e.g., the E911 system used in the United States), in which the network determines with sub-cell accuracy the location of a caller's phone and routes the call to an emergency operator who can, if necessary, dispatch emergency personnel to the user's location. Location-Based Services (LBS) are now expanding far beyond emergency calling, to such diverse uses as navigation, mapping, tracking and gaming.

Cell phones generally do not include built-in full-function GPS receivers because the phone would be undesirably large, and use of the GPS receiver would rapidly drain the cell phone battery. One common method by which UE location can be determined is known as Assisted GPS (A-GPS). An A-GPS-enabled UE contains a limited processing power GPS receiver, which is smaller and more power-efficient than a full-function GPS receiver. In A-GPS, the wireless telecommunications network transmits "assistance data" to the UE to aid the UE GPS receiver in finding and utilizing signals transmitted by the GPS satellites, as the GPS satellite signals that reach the receiver are sometimes weak or few in number due to shielding and reflection from buildings or terrain and, to the extent they can be detected at all, would otherwise require the processing power of a full-function GPS receiver to establish a location using them. As minimizing size and weight and maximizing battery charge conservation remain important goals for producers of cell phones, incorporating a more powerful GPS receiver capable of rapidly determining location without assistance data is not considered a commercially viable option. Some cell phones whose designs emphasize portability and battery conservation simply do not include even a limited processing power GPS receiver. Nevertheless, A-GPS is only one method by which a network can determine UE location. Other methods are based upon triangulation from known locations of base stations. Examples of such triangulation methods include Time Difference of Arrival (TDOA), Angle of Arrival (AOA), Forward Link Trilateration (FLT), and Observed Time Difference (OTD). In networks generally of the Global System for Mobile telecommunications (GSM) and Universal Mobile Telecommunications System (UMTS) types, the network element that responds to an LBS query by determining the user equipment location is known as a Gateway Mobile Location Center (GMLC).

It would be desirable to provide a method and system for geotagging photos in a wireless telecommunications network that does not require the UE to determine its own location and tag its photos, thereby conserving battery and processing power and other resources. It is to the provision of such a method and system that the present invention is directed.

SUMMARY OF THE INVENTION

The present invention relates to a wireless mobile telecommunications network method and system for geotagging an image (e.g., photo) or other multimedia message transmitted from wireless user equipment (UE) and received by the network. In an exemplary embodiment of the invention, in response to receiving the image, the network uses a conventional Location-Based Services (LBS) query to determine the geographic location of the UE. The network then tags the image with the determined geographic location. A Gateway Mobile Location Center (GMLC) or similar conventional means for determining UE location can respond to the LBS query by determining the geographic location of the UE in a conventional manner, such as by using a triangulation method.

In the exemplary embodiment of the invention, in which the network is generally of the GSM/UMTS type, a novel network element that can be referred to herein for convenience as a "geotagger" communicates with the network Multimedia Messaging Service Center (MMSC) or similar means for receiving images or other multimedia messages. When the network receives the image from the UE, the MMSC has the geotagger determine the UE geographic location and tag the image. The geotagger can act as an LBS client and query the GMLC for the UE location. Alternatively, in other embodiments of the invention, the MMSC or similar network element can itself be programmed or configured to determine the UE location and tag the image.

DETAILED DESCRIPTION

Figure 1:
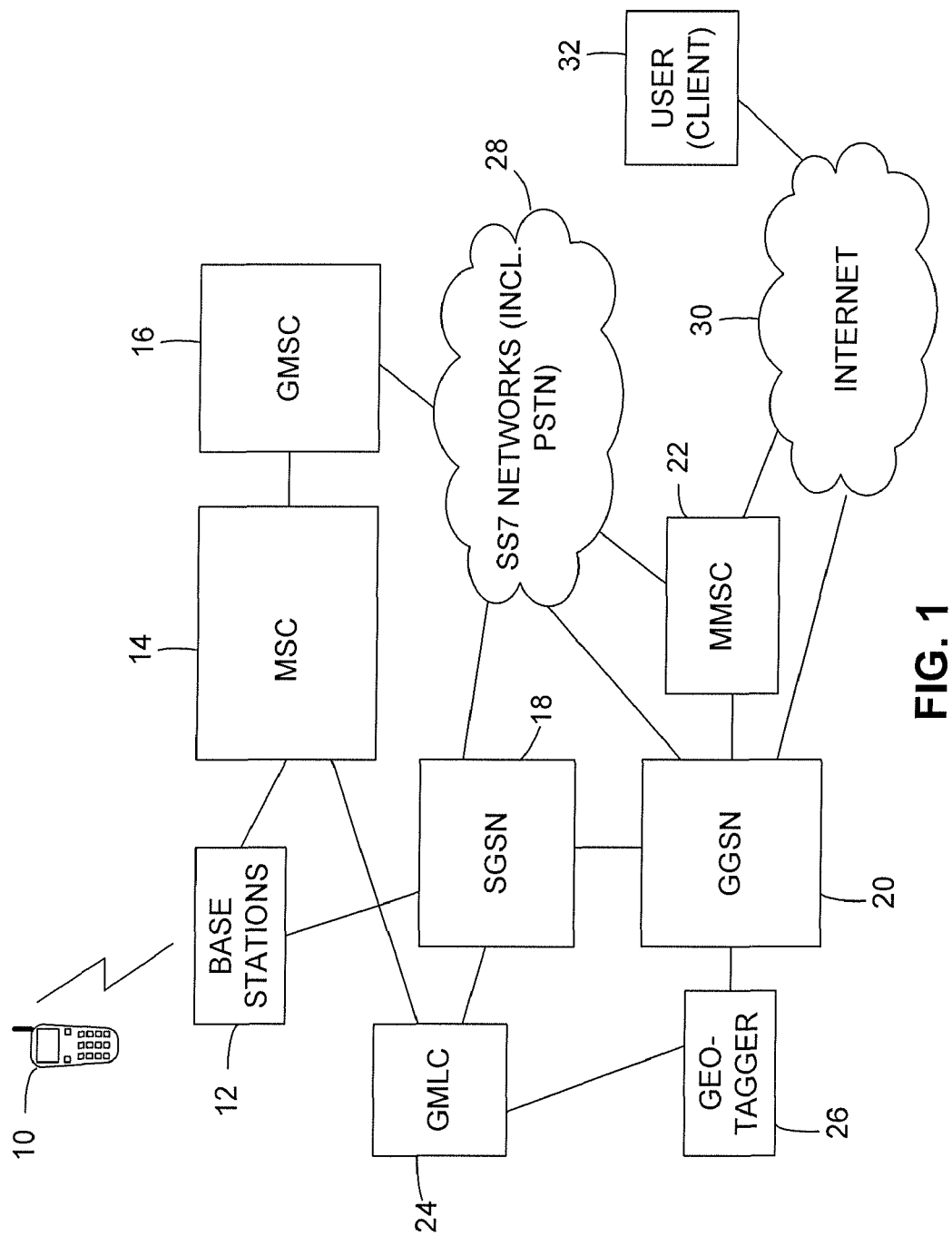
FIG. 1 illustrates a wireless mobile telecommunications system in which photos are geotagged in accordance with an exemplary embodiment of the present invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, in an exemplary embodiment of the invention a mobile telephone (also referred to as a cell phone or mobile station) or other user equipment (UE) 10 communicates with a wireless telecommunications network (also referred to as a cellular telecommunications network) having an architecture generally in conformance with the GPRS and UMTS standards. As known in the art, GPRS is a standard that has been adopted by many network service providers to expand the capabilities of telecommunications networks, such as those conforming to the Global System for Mobile telecommunications (GSM), to include services such as Wireless Application Protocol (WAP), Short Messaging Service (SMS) and Multimedia Messaging Service (MMS) as well as Internet communication services such as e-mail and World Wide Web access. As described in further detail below, MMS allows UE 10 to transmit to the network messages that include multimedia objects (e.g., images, audio, video, rich text, etc.). Although in the exemplary embodiment of the invention the network conforms to GPRS and uses MMS to handle image files or other multimedia messages, in other embodiments the network can use any other suitable means for handling such messages. The network architecture shown in FIG. 1 is intended only to be exemplary.

In the exemplary embodiment, the wireless telecommunications network includes one or more Base Stations 12, a Mobile Switching Center 14, a Gateway Mobile Switching Center 16, a Serving GPRS Support Node (SGSN) 18, a Gateway GPRS Support Node (GGSN) 20, a Multimedia Messaging Service Center (MMSC) 22, and a Gateway Mobile Location Center (GMLC) 24. For purposes of clarity, other elements that are commonly included in GSM, UMTS, GPRS, etc., networks, are not shown, and those well-known elements that are shown in FIG. 1 are shown in generalized form. Accordingly, for example, Base Stations 12 can comprise one or more Base Station Controllers, Base Transceiver Stations, Radio Network Controllers, Node-B's, Base Station Subsystems or other such elements that are known in the art to provide the air interface between user equipment (e.g., UE 10) and the remainder of the network in networks generally of the GSM or GPRS/UMTS types. The network further includes a novel geotagger 26 that, as described in further detail below, causes image files to be tagged with geographic location information as they are uploaded from UE 10 to the network.

UE 10 includes a built-in camera (not separately shown) with which the user can capture digital images, i.e., take photographs. The user can use UE 10 to transmit or upload the photographs or other images to the network in the form of MMS messages. Accordingly, UE 10 includes an MMS messaging client, which is a software program having a user interface with which the user can interact to compose, address, transmit, receive, and view MMS messages. The use of an MMS client in a cell phone or other user equipment to, for example, transmit a captured digital image, is well understood in the art and therefore not described in further detail herein.

The wireless mobile telecommunications network interfaces with external telecommunications networks 28 that operate in accordance with the Signaling System 7 (SS7) standard, such as the Public Switched Telephone Network (PSTN). The wireless telecommunications network also interfaces with the Internet 30 via MMSC 22 and GGSN 20. As known in the art, MMSC 22 controls the uploading of multimedia files, such as those of MMS messages received from UE 10, via Internet 30. Ultimately, a person can use a client computer 32 coupled to Internet 30, either directly or via an intermediate service provider system (not shown), to receive and view uploaded image files.

Figure 2:
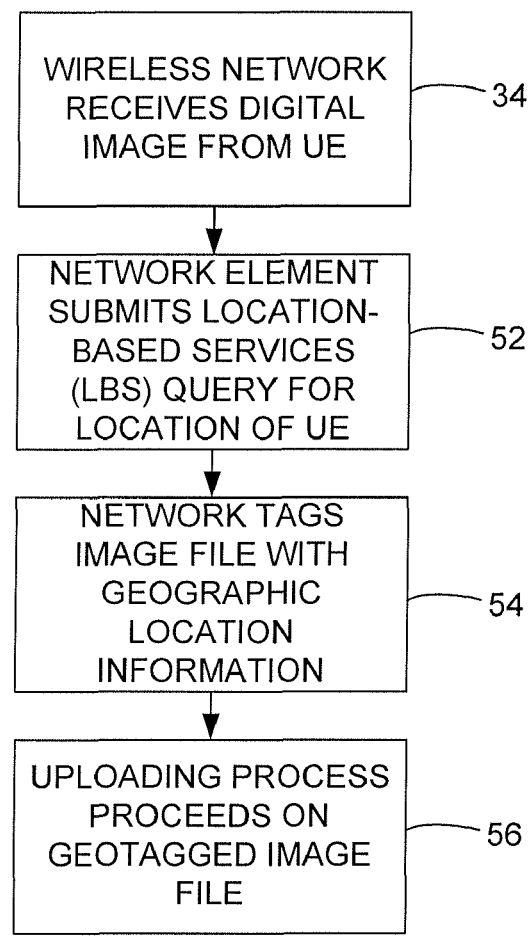
FIG. 2 is a flow diagram, illustrating a method for geotagging an image in the wireless mobile telecommunications network of FIG. 1.
Figure 3:
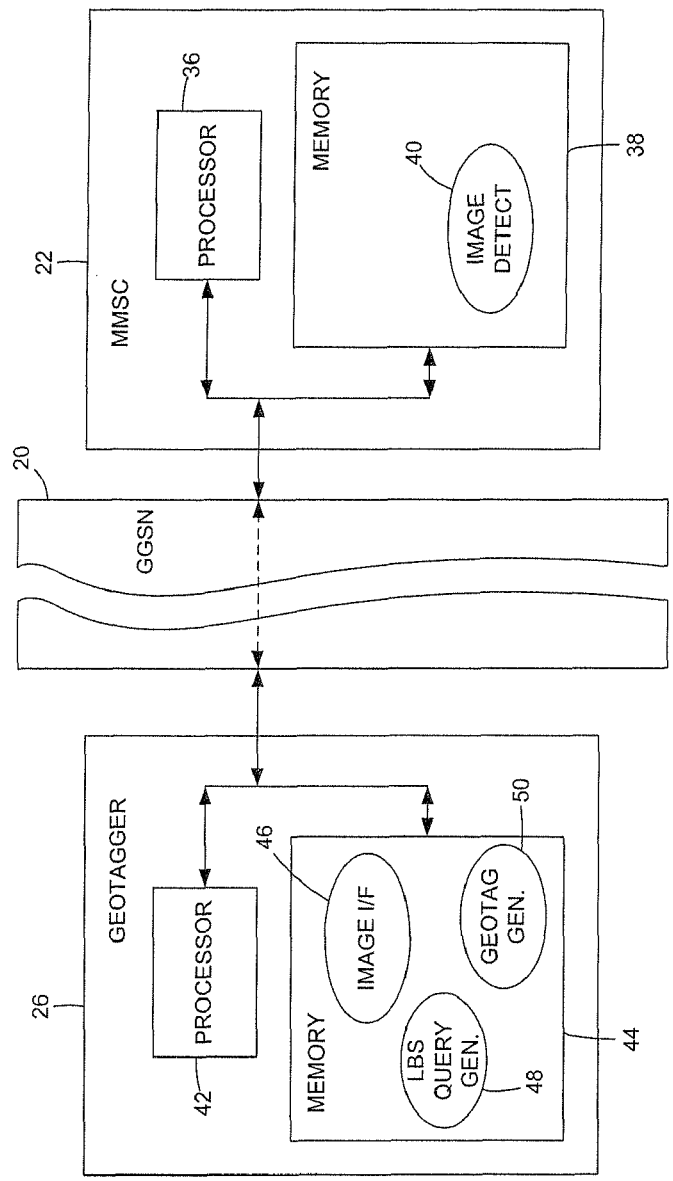
FIG. 3 illustrates a portion of the wireless mobile telecommunications network of FIG. 1 in further detail.

The flow diagram of FIG. 2 illustrates an exemplary method of the present invention. At step 34, the wireless mobile telecommunications network receives a digital image from UE 10. The image can be, for example, in the form of an MMS message. The image can be a photograph that the user has taken using the built-in camera of UE 10 or any other suitable image. The MMS message is routed to MMSC 22 in the conventional manner, via SGSN 18 and GGSN 20. MMSC 22 detects the arrival of an MMS message bearing image data. Referring briefly to FIG. 3, MMSC 22, which, like many common network elements, is essentially a network computing device and thus includes characteristic processor 36 and memory 38 elements that, together with software elements executed from memory 38, define the programmed processing system that performs the functions for which the device has been programmed. As the processor system of MMSC 22 is programmed to perform various well-known functions relating to the handling of MMS messages, these message handling functions are embodied in software elements or instructions that processor 36 executes from memory 38 but which are not shown for purposes of clarity. The image detector element 40, shown for purposes of illustration as conceptually residing in memory 38, relates to detecting the arrival of an MMS message bearing image data, as noted above with regard to step 34 (FIG. 2). The processor system, in response to detecting the arrival of an MMS message bearing image data, forwards the MMS message to geotagger 26, which is similarly computer-like in that it includes a processor 42 and memory 44 that, together with software elements executed from memory 44, define a programmed processing system. The software elements shown for purposes of illustration as conceptually residing in memory 44 include an image interface 46, a Location-Based Services (LBS) query generator 48, and a tag generator 50.

Image interface 46 represents the function of receiving the MMS message from MMSC 22 and returning the MMS message, once its image has been geotagged, to MMSC 22. Location-Based Services query generator 48 acts as client software with respect to GMLC 24 (FIG. 1) and represents the function of generating an LBS query to GMLC 24 in response to receipt of the MMS message. Thus, as indicated by step 52 (FIG. 2), geotagger 26 submits this LBS query to GMLC 24 when it receives the MMS message from MMSC 22. Then, when geotagger 26 receives a reply from GMLC 24 indicating the geographic location of UE 10, it modifies the MMS message data to include a tag indicating the geographic location of UE 10, as indicated by step 54 (FIG. 2). The tag can be, for example, an Exchangeable Image File Format (EXIF) header. Tag generator 50 represents this function of transforming the reply from GMLC 24 indicating the geographic location of UE 10 into a suitable format, and modifying the MMS message data accordingly. As noted above, the resulting geotagged MMS message is returned to MMSC 22. The message proceeds through any additional steps of the overall uploading process in the conventional manner, under control of MMSC 22, as indicated by step 56 (FIG. 2).

Note that in the exemplary embodiment the messages that are exchanged between MMSC 22 and geotagger 26 pass through GGSN 20. Geotagger 26 tags the MMS message and returns it to MMSC 22. Alternatively, in another embodiment (not shown), the processing system of MMSC 22 can be programmed to, in response to receiving an MMS message bearing an image, obtain the location information and tag the MMS message, thereby obviating the need for a separate geotagger 26. In still other embodiments (not shown), the processing system of GGSN 20 (not shown) can be programmed in the manner described above instead of the system including a separate geotagger 26. Still other variations will occur readily to persons skilled in the art to which the invention pertains in view of the teachings herein.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method comprising:
  receiving, at a network computing device of a wireless mobile telecommunications network, a message transmitted by a user equipment, wherein the message is received at the network computing device via the wireless mobile telecommunications network and wherein the network computing device comprises a processor;
  determining, by an image detector element of the network computing device, that the message comprises image data;
  in response to determining that the message comprises the image data, requesting, by the network computing device, from a network element of the wireless mobile telecommunications network, location information of the user equipment; and
  in response to receiving the location information of the user equipment from the network element, modifying, by the network computing device, the message to indicate a geographic location of the user equipment.

2. The method of claim 1, wherein the location information of the user equipment is determined by the network element of the wireless mobile telecommunications network using a triangulation method.

3. The method of claim 1, wherein requesting the location information of the user equipment comprises:
  generating a location-based services query; and
  submitting the location-based services query to the network element of the wireless mobile telecommunications network, wherein the network element of the wireless mobile telecommunications network comprises a gateway mobile location center.

4. The method of claim 1, wherein the network computing device of the wireless mobile telecommunications network comprises a multimedia messaging service center.

5. The method of claim 1, wherein the message is a multimedia messaging service message.

6. The method of claim 1, wherein modifying the message to indicate the geographic location of the user equipment comprises modifying the message to include a tag indicating the geographic location of the user equipment.

7. The method of claim 6, wherein the tag comprises an exchangeable image file format header.

8. A network computing device of a wireless mobile telecommunications network, the network computing device comprising:
   a processor; and
   a memory storing instructions that, when executed by the processor, cause the processor to perform operations comprising
      receiving, from a user equipment via the wireless mobile telecommunications network, a message,
      determining, by an image detector element, that the message comprises image data,
      in response to determining that the message comprises the image data, requesting, from a network element of the wireless mobile telecommunications network, location information of the user equipment, and
      in response to receiving the location information of the user equipment from the network element, modifying the message to indicate a geographic location of the user equipment.

9. The network computing device of claim 8, wherein the location information of the user equipment is determined by the network element of the wireless mobile telecommunications network using a triangulation method.

10. The network computing device of claim 8, wherein requesting the location information of the user equipment comprises:
   generating a location-based services query; and
   submitting the location-based services query to the network element of the wireless mobile telecommunications network, wherein the network element of the wireless mobile telecommunications network comprises a gateway mobile location center.

11. The network computing device of claim 8, wherein the message is a multimedia messaging service message.

12. The network computing device of claim 8, wherein modifying the message to indicate the geographic location of the user equipment comprises modifying the message to include a tag indicating the geographic location of the user equipment.

13. The network computing device of claim 12, wherein the tag comprises an exchangeable image file format header.

14. A non-transitory memory storing instructions that, when executed by a processor of a network computing device of a wireless mobile telecommunications network, cause the processor to perform operations comprising:
   receiving, via the wireless mobile telecommunications network, a message transmitted by a user equipment;
   determining, by an image detector element of the network computing device, that the message comprises image data;
   in response to determining that the message comprises the image data, requesting, from a network element of the wireless mobile telecommunications network, location information of the user equipment; and
   in response to receiving the location information of the user equipment from the network element, modifying the message to indicate a geographic location of the user equipment.

15. The non-transitory memory of claim 14, wherein the location information of the user equipment is determined by the network element of the wireless mobile telecommunications network using a triangulation method.

16. The non-transitory memory of claim 14, wherein requesting the location information of the user equipment comprises:
   generating a location-based services query; and
   submitting the location-based services query to the network element of the wireless mobile telecommunications network, wherein the network element of the wireless mobile telecommunications network comprises a gateway mobile location center.

17. The non-transitory memory of claim 14, wherein the network computing device of the wireless mobile telecommunications network comprises a multimedia messaging service center.

18. The non-transitory memory of claim 14, wherein modifying the message to indicate the geographic location of the user equipment comprises modifying the message to include a tag indicating the geographic location of the user equipment.

19. The non-transitory memory of claim 18, wherein the tag comprises an exchangeable image file format header.

20. The non-transitory memory of claim 14, wherein the message is a multimedia messaging service message.

* * * * *